US008799980B2

(12) United States Patent
Shafer et al.

(10) Patent No.: US 8,799,980 B2
(45) Date of Patent: Aug. 5, 2014

(54) ENFORCEMENT OF NETWORK DEVICE CONFIGURATION POLICIES WITHIN A COMPUTING ENVIRONMENT

(75) Inventors: Philip A. Shafer, Raleigh, NC (US); Robert P. Enns, Los Gatos, CA (US); Paulo Lima, Kanata (CA); Greg Sidebottom, Ottawa (CA); William P. Welch, Wakefield, MA (US); Michael S. Jacobsen, Mountain View, CA (US); Craig A. Bardenheuer, Harvard, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 2833 days.

(21) Appl. No.: 11/326,128

(22) Filed: Jan. 5, 2006

(65) Prior Publication Data

US 2007/0113273 A1   May 17, 2007

Related U.S. Application Data

(60) Provisional application No. 60/737,300, filed on Nov. 16, 2005.

(51) Int. Cl.
*H04L 29/06* (2006.01)
*G06F 15/16* (2006.01)
*H04L 12/24* (2006.01)
*G06Q 10/06* (2012.01)

(52) U.S. Cl.
CPC ........ *H04L 41/0869* (2013.01); *H04L 41/0803* (2013.01); *H04L 41/0893* (2013.01); *G06Q 10/06* (2013.01); *H04L 41/06* (2013.01); *H04L 41/0856* (2013.01); *H04L 41/082* (2013.01)
USPC ................................... 726/1; 705/56; 726/27

(58) Field of Classification Search
USPC ....... 726/11; 709/220, 226; 370/401; 706/47; 714/47
See application file for complete search history.

(56) References Cited

U.S. PATENT DOCUMENTS

| 6,651,191 B1 * | 11/2003 | Vacante et al. .................. 714/47 |
| 6,760,761 B1 * | 7/2004 | Sciacca ......................... 709/220 |
| 8,726,286 B2 * | 5/2014 | Gururaja et al. .............. 718/102 |
| 2003/0021283 A1 * | 1/2003 | See et al. ...................... 370/401 |
| 2004/0230681 A1 * | 11/2004 | Strassner et al. ............. 709/226 |
| 2007/0094199 A1 * | 4/2007 | Deshpande et al. ............ 706/47 |
| 2012/0023546 A1 * | 1/2012 | Kartha et al. ..................... 726/1 |

* cited by examiner

*Primary Examiner* — Christopher Revak
(74) *Attorney, Agent, or Firm* — Shumaker & Sieffert, P.A.

(57) ABSTRACT

A network management system is described for assuring that a network device complies with a device-specific configuration policy. One example of the network management system contains one or more business rules that describe a business policy regarding a computer network in a network-independent form. In general, the business rules refer to high-level business requirements and not to device-specific configuration information. The network management system uses the business rule to determine which business policies are currently in force. In addition, the network management system contains one or more network design rules that describe relationship between the business policy and one or more device-specific configuration policies. The network management server uses the network design rules to determine whether to deploy a device-specific configuration policies. In this manner, an administrator or other user may create high-level business rules without regard to particular network devices or topologies, yet device-specific configuration polices are deployed to the network devices to assure compliance even if the network management system is bypassed.

28 Claims, 5 Drawing Sheets

ENFORCEMENT OF NETWORK DEVICE CONFIGURATION POLICIES WITHIN A COMPUTING ENVIRONMENT

This application claims the benefit of U.S. provisional application Ser. No. 60/737,300, filed Nov. 16, 2005, the entire content of which is incorporated herein by reference.

TECHNICAL FIELD

The invention relates to computer networks and, more specifically, configuring devices in computer networks.

BACKGROUND

A computer network is composed many interconnected devices executing concurrently. Often, each device has a broad range of configuration options. While a broad range of configuration options increases the flexibility of the devices, it also brings the opportunity to misconfigure the devices. A misconfigured device can undermine the efficiency of a network, negatively affect the business goals of an enterprise operating the network or render the network susceptible to a network attack.

In the past, network administrators have attempted to limit the misconfiguration of devices by writing sets of policies for each device in the network, and then utilize a network management system to control configuration of the network. However, a network administrator could intentionally or inadvertently defeat these policies by directly accessing a device in the network and altering the configuration of the device. In other cases, an administrator may rely on particular features offered by individual device to limit the configuration that may be applied to that device. However, device-specific features of the individual device are disconnected from the higher-level configuration goals for overall network. Moreover, network administrators would have to write these policies at a low, device-specific level so that policies can be applied to the individual device. This is especially burdensome for writing business policies that may employ numerous higher-level concepts. Thus, there is often a disconnect between high-level network management systems and control enforced at the individual devices.

SUMMARY

In general, principles of this invention are directed to techniques to create and enforce device configuration policies in devices connected by a computer network. Specifically, a network management system is described that provides mechanisms by which an administrator may define high-level business rules for controlling configuration of a network.

In one embodiment, the network management system utilizes a business rule language to define one or more business rules. These business rules describe business policies at a high-level. Specifically, the business rules may be independent of the particular devices within the network. In other words, a single business rule may be applied to control network configuration, regardless of the types of routers, switches, firewalls, gateways, hubs or other specific devices of the network. Furthermore, the business rules apply to one or more devices in the computer network.

In addition, the network management system may utilize a network design language to define network design rules that describe relationships between business policies and device-specific configuration policies in terms of devices and device configurations. The network design rules may refer to device-specific configuration policies that may be applied to individual devices to locally constrain configuration of those devices. The network design rules may refer to facts used in the business rules. In this way, the triggering of a business rule may trigger a network design rule. Triggering of a network design rule may cause the deployment of the device-specific policies. Thus, the network design language may be viewed as an intermediate language used to specify rules that bind the high-level business rules to low-level configuration policies in response to events. In this manner, an administrator may define high-level rules for controlling the configuration of the network in a manner that is consistent with the business goals.

Subsequently, when devices in the computer network receive a configuration change request from an administrator or software agent, the devices apply the installed device configuration policies to control application of the change request. For example, the devices apply the configuration change request when the configuration change request satisfies the particular device-specific configuration policy installed within that device. Otherwise, if the configuration change requests do not satisfy the device-specific configuration policy, the devices may reject the configuration change requests. In this way, the devices prevent administrators from misconfiguring the devices relative to the device-specific configuration policy regardless of the technique by which the administrator accessed the device, e.g., via the a centralized network management system or via direct access.

For example, suppose that an enterprise does not want any activity on its enterprise network between 8:00 pm and 6:00 am. The network administrator may interact with the network management system to define a business rule. When the time is between 8:00 pm and 6:00 am, the condition of the business rule becomes true. This may make the condition of a network design language (NDL) rule true. Consequently, a device-specific configuration policy may be deployed to block network activity. When one or more of the policies are deployed within the devices on the network, configuration policy enforcement modules on each network device incorporate this policy into configuration databases that govern how the network devices behave. Thus, in this example, the network devices prevent network activity between 8:00 pm and 6:00 am. If the network administrator later attempts to directly access and reconfigure a particular network device in the enterprise network to allow network traffic during these hours, the configuration policy enforcement module on the network device may prevent the network administrator from doing so.

In one embodiment, a method comprises invoking a rules engine of a network management system to evaluate a business rule to determine whether to enforce a device-independent business policy regarding a computer network having a plurality of network devices. The method further comprises, when the device-independent business policy is to be enforced, invoking the rules engine of a network system to evaluate a network design rule that relates the business policy to a device-specific configuration policy, and deploying the device-specific configuration policy to a set of one or more of the network devices of the computer network.

In another embodiment, a network management system comprises a set of business rules and a set of network design rules. The business rules describe device-independent business policies and are written in a format that conforms to a business rule definition language that is independent of the types of network devices within a computer network. The set of network design rules relate the device-independent business policies to device-specific configuration policies. The network design rules conform to a network design language used to describe the network devices and topology of the network. The network management system further includes a rules engine that evaluates the business rules and the network design rules to select one or more of the device-specific configuration policies for deployment, and a deployment engine that deploys the selected device-specific configuration policies to one or more of the network devices in response to the rules engine to configure the one or more network devices to conform to the selected device-specific configuration policies.

In another embodiment, a computer-readable medium contains instructions. The instructions cause a programmable processor to determine whether a business policy regarding a computer network is currently in force by evaluating a business rule that describes the business policy. The instructions also cause the processor to determine whether to deploy a device-specific configuration policy by evaluating a network design rule that describes a relation between the business policy and a device-specific configuration policy, and deploy the device-specific configuration policy to direct a network device to conform to the device-specific configuration policy.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
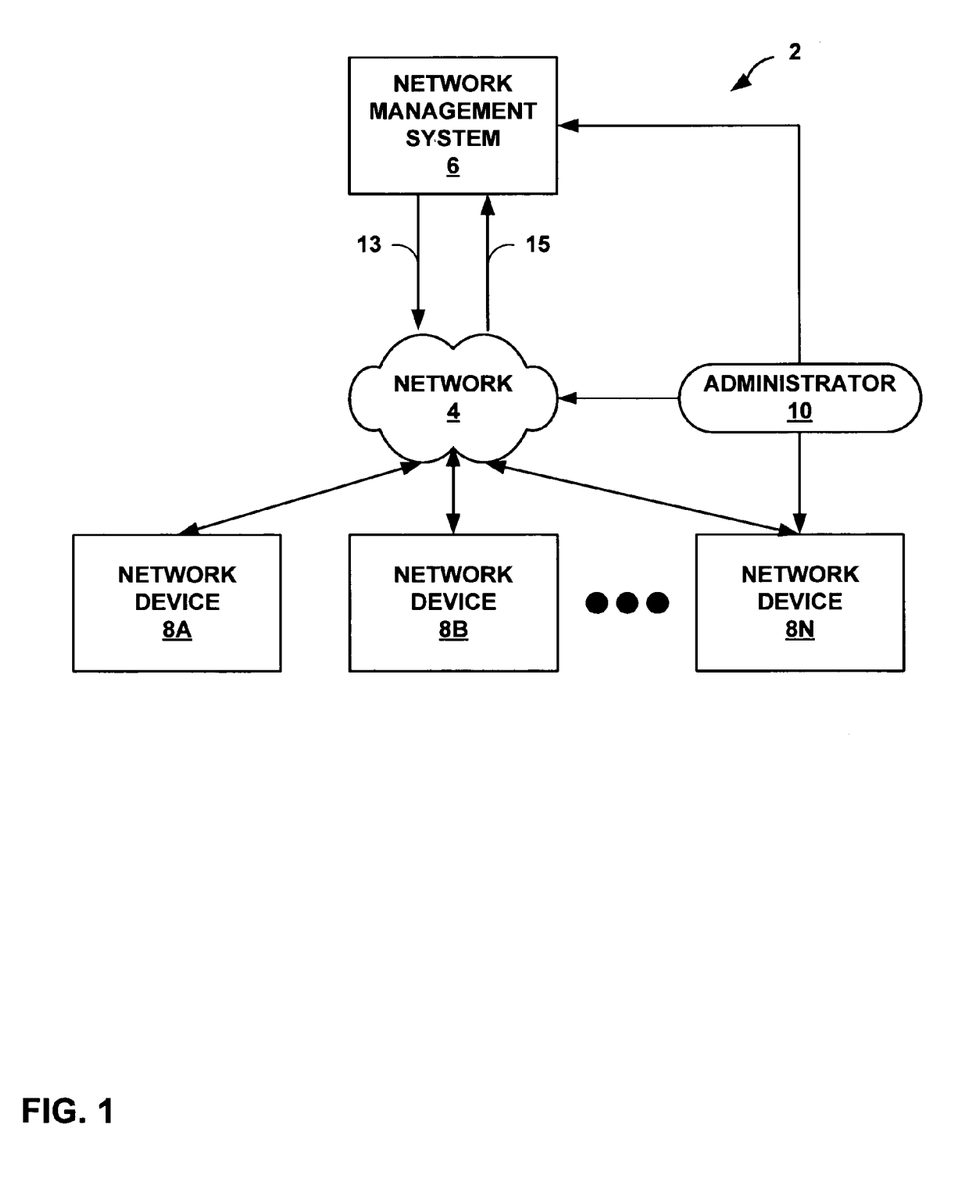
FIG. 1 is a block diagram illustrating an exemplary system in which devices of a computer network use a configuration policy enforcement system.

FIG. 1 is a block diagram illustrating an exemplary system 2 in which devices of a network 4 use a configuration policy enforcement system. In particular, network 4 facilitates communication between a network management system (NMS) 6 and network devices 8A through 8N (collectively, network devices 8). Network 4 may be a local area network (LAN), a wide-area network (WAN) such as the Internet, a telephone network, or any other computer network.

To configure network 4, administrator 10 may install a set of business rules written in a business rule definition language on NMS 6. Each business rule describes a business policy regarding network 4. In this embodiment, the business rules do not refer to individual network elements such as network devices 8. Instead, business rules refer to general patterns of "facts" and business units. For instance, a business rule may refer to a "finance" department of an enterprise. "Facts" refer to conditions within a forward-chaining rule-based environment used to fire the business rules. In this way, a business rule is not dependent on a particular implementation of a network 4 or network devices 8.

To define a business rule, administrator 10 defines a condition and one or more actions. NMS 6 performs the actions when the condition is satisfied. For instance, an action may cause NMS 6 to change the state of an individual fact within the forward-chaining environment when the condition is satisfied, thereby asserting the fact. When the facts associated with a business rule installed on NMS 6 are asserted, the business policy described in the business rule is "in force." A condition may refer to one or more facts. Because a business rule operates at a high level of abstraction, these facts may refer to general facts and business units. For purposes of evaluation the condition, a fact is said to be true when the fact is asserted.

For example, suppose that an enterprise wants to ensure that the finance department has priority to network bandwidth through network 4 to the sales department on the last day of every quarter. Administrator 10 may express such a business rule as:

If date(Year, Month, Day) and endOfQuarter(Month, Day)
    then assert highPriority("finance", "sales")

In this case, date (Year, Month, Day) and endOfQuarter (Month, Day), constitutes the condition and highPriority ("finance", "sales") constitutes the fact to be asserted. Thus, if the quarter ends on September 31 and today is September 31, the business policy of giving high priority to network traffic between finance and sales is "in force."

In addition to the business rules, administration 10, other users, or other software agents may install one or more network design language (NDL) rules onto NMS 6. NDL rules may be written in a network design language. NDL rule may be viewed as a lower-level rule that describes a relationship between a business policy (e.g., one or more business rules) and a device-specific configuration policy to be deployed within the network. Each NDL rule typically is a statement that refers to particular network devices and device configurations in network 4. In other words, NDL rules address the devices that constitute network 4, whereas business rules address network 4 as a whole.

Like business rules, each NDL rule may include a condition and one or more assertable facts. The condition of a NDL rule may refer to one or more facts. For instance, the condition of an NDL rule may include a fact that the sales department uses network 10.10.10.0/24. A second fact may state that the finance department uses network 10.10.30.0/24. Other types of facts used in an NDL rule may state information about router interfaces, device addresses, and so on. In addition, the condition portion of an NDL rule may include one or more facts used in business rules. For example, an NDL rule may include the highPriority ("finance", "sales") fact. In contrast, business rules typically do not use facts that refers to device-specific information, thereby maintain a level of abstraction and independence from the particulars of the network. For instance, administrator 10 would typically not define a business rule that refers to the fact that the finance department uses network 10.10.30.0/24. This is because this fact does not refer to business units or concepts exclusively and, instead, refers to particular network constraints.

External inputs may cause NMS 6 to assert or de-assert a fact. That is, throughout the course of operating a configuration policy enforcement system, facts may become asserted or stop being asserted. For instance, NMS 6 may receive one or more network events 15 from network 4 that contain information relevant to determining whether to deploy device-specific configuration policies. A wide variety of network devices may generate events 15. For example, potential sources of events 15 may include application servers, business management systems, network appliances, personal computers, and so on. Events 15 may contain information about current conditions of network devices 8. For example, a network event may contain information that a network device acting as a web server is experiencing a high volume of requests. In addition, network events may events 15 may contain information relevant to determining whether a business policy is currently in force. For instance, a network event may contain information that the business has decided to change when it calculates quarterly earnings. In this case, the network event would cause endOfQuarter(September, 30) to stop being asserted and cause endOfQuarter(November, 30) to start being asserted.

In addition, configuration changes made throughout the network environment by administrator 10 may change which facts are asserted by NMS 6. For example, network configuration changes by administrator 10 may result in the assertion of net("finance", "10.10.30.0/24") and net("sales", "10.10.10.0/24") facts. Similarly, interface(Net1, If1) facts may be asserted when administrator 10 configures particular interfaces on devices. For example, the interface(Net1, If1) fact may be asserted when administrator 10 may provides configuration data that asserts interface("10.10.30.0/24", "atm1/4.3@newyorkrouter").

In addition, NMS 6 may directly assert or de-assert a fact. For example, NMS 6 may assert date("2005", "09", "28") as a fact. As time passes and the year, month, or day change, NMS 6 asserts and de-asserts the date fact. For instance, at the end of a day, NMS 6 may stop asserting date("2005", "09", "28") and start asserting date("2005", "09", "29").

When NMS 6 asserts or de-asserts a fact, NMS 6 determines whether a business policy is currently in force by evaluating a business rule. In addition, NMS 6 determines whether to deploy a device-specific configuration policy by evaluating a network design rule. Specifically, NMS 6 reevaluates all conditions of the business and NDL rules. Because a fact is considered true when the fact is asserted and because facts may become asserted or de-asserted, previously unsatisfied conditions may become satisfied, and vice versa. Evaluation of the conditions may cause NMS 6 to assert or de-assert other facts. In other words, one rule may trigger another. This process continues until NMS 6 has evaluated all conditions and the evaluation has caused no new facts to be asserted or de-asserted. For instance, suppose the business rule condition If date (Year, Month, Day) and endofQuarter (Month, Day) was previously unsatisfied. Then, suppose that NMS 6 asserts the fact date("2005", "sept", "30"). Now, the condition If date(Year, Month, Day) and endofQuarter (Month, Day) is satisfied. NMS 6 then asserts highPriority ("finance", "sales"). The assertion of highPriority("finance", "sales") causes NMS 6 to reevaluate the conditions of the rules. If any conditions of the rules that were previously unsatisfied are now satisfied, NMS 6 asserts the corresponding facts. For example, when NMS 6 asserts highPriority ("finance", "sales"), the previously unsatisfied condition in the NDL rule, If highPriority(Dept1, Dept2) and net(Dept1, Net1) and net(Dept2, Net2) and interface(Net1, If1) and interface (Net2, If2)

may become satisfied. Satisfaction of this condition may enable the device-specific configuration policy:

assert requireConfig(If1, ifPolicy(trafficBetween(Net1, Net2), trafficClass("expedited"))).

The action of a NDL rule may refer to one or more requireConfig facts. Each requireConfig fact represents a device-specific configuration policy. A device-specific configuration policy is a statement to a particular device in network 4 concerning the configuration of the particular device. For instance, a device-specific configuration policy may state that a device called "fe1/2.3@tokyorouter" must expedite traffic between network 10.10.10.0/24 and network 10.10.30.0/24. Such a device-specific configuration policy may appear as requireConfig(If1, if Policy(trafficBetween(Net1, Net2), trafficClass("expedited"))).

When NMS 6 asserts a requireConfig fact, NMS 6 deploys the device-specific configuration policy represented by the requireConfig fact. In one embodiment, when NMS 6 deploys a device-specific configuration policy, NMS 6 distributes the device-specific configuration policy to network devices 8 as one or more policy messages 13. Upon receiving policy messages 13, network devices 8 reconfigure themselves to implement the device-specific configuration policy. When NMS 6 stops deploying a device-specific configuration policy, NMS 6 sends one or more policy messages 13 to network devices 8 that alert network devices 8 that a device-specific configuration policy is no longer in force. In the above example, if network device 8A implements the atm1/4.5@newyork-router interface, network device 8A expedites traffic between networks 10.10.30.0/24 and 10.10.10.0/24 at least as long as the device-specific configuration policy represented by the highPriority(Dept1, Dept2) and net(Dept1, Net1) and net (Dept2, Net2) and interface(Net1, If1) and interface(Net2, If2) fact remains asserted.

Network devices 8 may be any type of configurable network device. For instance, network devices 8 may be firewalls, routers, personal computers, network telephones, switches, hubs, personal digital assistants, cellular telephones, network appliances, servers, set-top boxes, or other devices. Each of network devices 8 may have a range of configuration options. A configuration profile of each of network devices 8 defines the current values of the configuration options. For example, if network device 8A is a firewall, administrator 10 may configure network device 8A to block Telnet traffic originating from address 124.210.200.001. In this case, network device 8A stores this information in its configuration profile.

To change the configuration profile, i.e., to configure, a device such as network device 8A, administrator 10 may deliver a configuration change request to device 8A. For example, a configuration change request may instruct network device 8A to block traffic from a certain source during certain hours. In an exemplary configuration policy enforcement system, administrator 10 may not freely reconfigure controlled network devices 8. That is, network devices 8 do not necessarily implement every configuration change request delivered by an administrator. Rather, configuration profiles of network devices 8 conform to device-specific configuration policies when NMS 6 deploys the device-specific configuration policies.

When network devices 8 receive configuration change requests, network devices 8 examine each deployed device-specific configuration policy. If the configuration change request is consistent with the deployed device-specific configuration policies, network devices 8 apply the configuration change request. On the other hand, if the configuration change request is not consistent with the deployed device-specific configuration policies, network devices 8 might not apply the configuration change request.

Network devices 8 may perform a specific action when a configuration change request is not consistent with a deployed device-specific configuration policy. In other words, network devices 8 may perform a specific action when a configuration change request is inconsistent with a deployed device-specific configuration policy. For instance, when the configuration change request is inconsistent with a deployed device-specific configuration policy, network device 8A may perform the action of rejecting the configuration change request. Alternately, network device 8A may apply the configuration change request and generate an event. The event may be a warning to administrator 10 that the configuration change request is inconsistent with a deployed device-specific configuration policy. In another example, network device 8A may receive an identity credential for a user who is submitting a configuration change request. Network device 8A then applies the configuration change request to network device 8A when the identity credential matches a stored identity credential. In this way, a senior administrator can override a deployed device-specific configuration policy.

A system implementing enforcement of device configuration policies may present one or more advantages. For instance, network administrators in a large organization may not be cognizant of every business policy of the organization. Consequently, an administrator may attempt to reconfigure a network device 8 to meet a short term exigency without realizing that the attempted reconfiguration would be contrary to an established policy of the organization. The configuration policy enforcement system may prevent this administrator from inadvertently misconfiguring the network device. Furthermore, because the configuration policy enforcement system is present on each network device in the network of the organization, the network administrator may not be able to accidentally or intentionally misconfigure a network device by directly accessing the device.

The business rule definition language may present additional advantages. In the business rule definition language, an administrator defines a rule in terms of a condition and an action. The administrator may define business rule without regard for the particular network devices 8 and topology of the network environment. This may simplify the process of writing business rules. Moreover, these rules need not be specific to the particular manufacturers of network devices or the particular methods of interacting with the network devices 8. In this manner, high-level business rules may be written that prevent network administrator from bypassing NMS 6 and intentionally or inadvertently defeating the corporate policies by directly accessing a network device 8 in the network and altering the configuration of the device.

Figure 2:
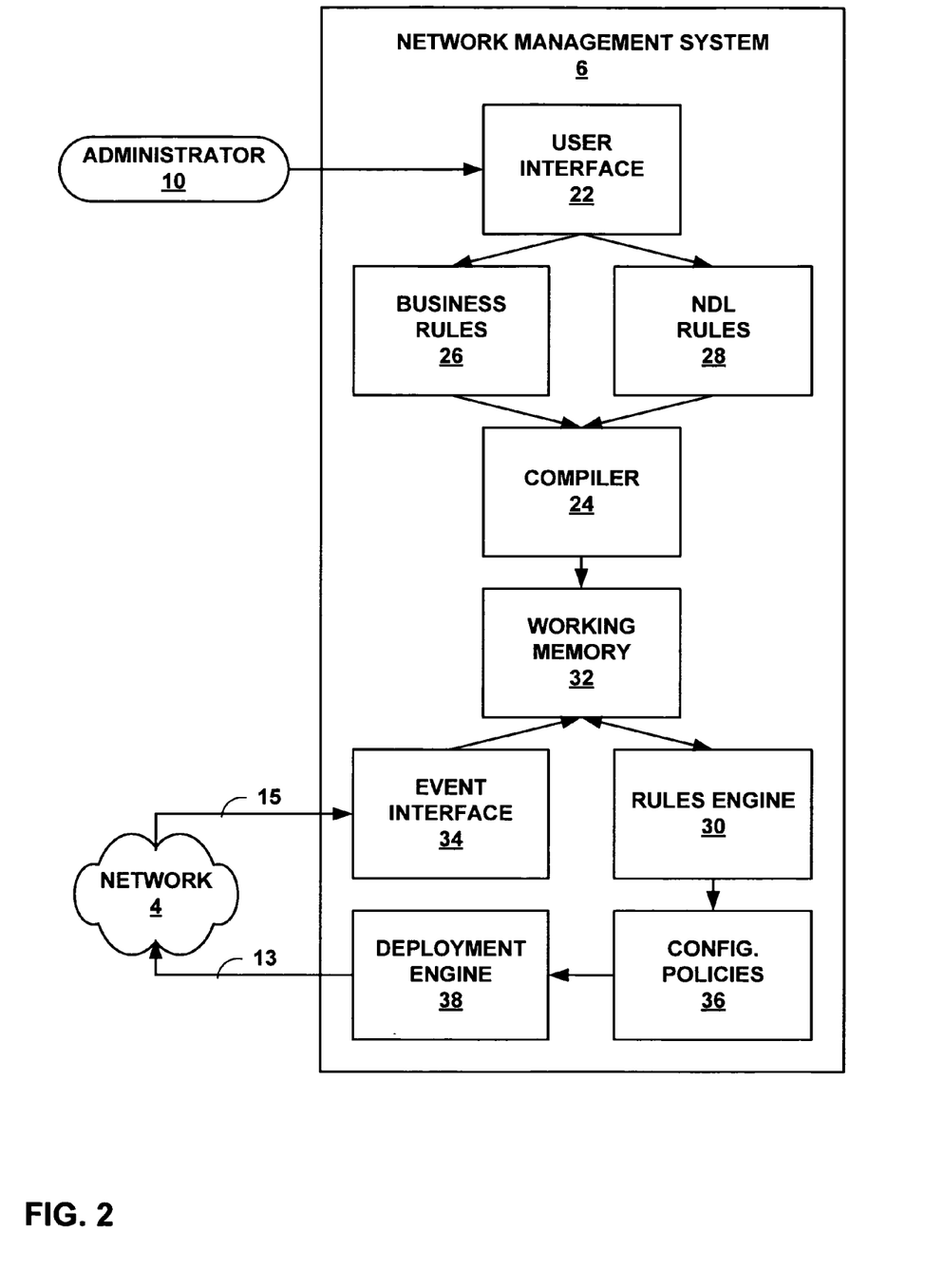
FIG. 2 is a block diagram illustrating an exemplary network management system used in the configuration policy enforcement system of FIG. 1.

FIG. 2 is a block diagram illustrating an exemplary embodiment of network management system (NMS) 6 (FIG. 1). In this exemplary embodiment, NMS 6 includes a user interface 22, a rules compiler 24, a set of business rules 26, a set of network design language (NDL) rules 28, a rules engine 30, a working memory 32, an event interface 34, a set of configuration policies, 36 and a deployment engine 38.

Administrator 10 interacts with NMS 6 through user interface 22. User interface 22 may be a graphical user interface. For instance, user interface 22 may provide a series of web pages to administrator 10. Alternatively, user interface 22 may be a command line interface through which administrator 10 enters text-based commands. Regardless of the style of interface 22, administrator 10 may utilize user interface 22 to provide NMS 6 with one or more business and NDL rules. Upon receiving a business rule through user interface 22, user interface 22 inserts the business rule into set of business rules 26. Similarly, upon receiving a NDL rule through user interface 22, user interface 22 inserts the NDL rule into set of NDL rules 28.

When user interface 22 inserts a new business rule into set of business rules 26, rules compiler 24 compiles the new business rule into working memory 32. After compilation, the new business rule is in a form that rules engine 30 is able to use. In particular, rules compiler 24 creates one or more data structures in working memory 32 that embody the business rule in a format useful to rules engine 30. Similarly, when user interface 22 inserts a new NDL rule into set of NDL rules 28, rules compiler 24 compiles the new NDL rule into working memory. After compilation into working memory 32, business rules and NDL rules may be functionally indistinguishable.

In addition to the data structures that embody the business rules and the NDL rules, working memory 32 contains a set of facts. For instance, working memory 32 may contain data structures representing the fact date("2005", "sept", "30") or net("finance", "10.10.30.0/24"). Rules engine 30 detects changes in working memory 32. For example, rules engine 30 detects when facts are updated, e.g., when date ("2005", "sept", "29") changes to date("2005", "sept", "30").

When rules engine 30 detects a change in a fact in working memory 32, rules engine 30 reevaluates all conditions of the compiled rules in working memory 32 to determine whether to fire one or more rules that puts a business policy into force and, in turn, deploys a one or more device-specific configuration policies. Rules engine 30 may use a forward-chaining algorithm to reevaluate the conditions of business and NDL rules. For instance, rules engine 30 may implement the RETE algorithm described in Forgy, C. L.: 1982, 'RETE: a fast algorithm for the many pattern/many object pattern match problem', Artificial Intelligence 19, pages 17-37, (1982) hereby incorporated by reference. Other alternative forward-chaining algorithms include the TREAT algorithms, and LEAPS algorithm, as described by Miranker, D. P.: 'TREAT: A New and Efficient Match Algorithm for AI Production Systems'. ISBN 0934613710 Daniel P. Miranker, David A. Brant, Bernie Lofaso, David Gadbois: On the Performance of Lazy Matching in Production Systems. AAAI 1990: 685-692, each of which is hereby incorporated by reference.

Rules engine 30 determines whether a business policy is currently in force by determining whether the facts in working memory 32 satisfy a condition of a business rule. Specifically, rules engine 30 detects a change in a current state of working memory 32. For instance, rules engine 30 may detect that date ("2005", "sept", "29") has changed to date("2005", "sept", "30") in working memory 32. When rules engine 30 detects that the current state of working memory 32 has changed, rules engine 30 determines whether a condition of a business rule is satisfied in light of the current state of working memory 32. For example, rules engine 30 may reevaluate the condition If date(Year, Month, Day) and endofQuarter (Month, Day). After reevaluating this condition, rules engine 30 may assert highPriority ("finance", "sales"). In this way, rules engine 30, asserts a fact when a business policy is currently in force. When rules engine 30 asserts a fact, rules engine 30 changes the current state of working memory 32. For instance, rules engine 30 may insert highPriority ("finance", "sales") into working memory 32. Rules engine 30 then detects this change in working memory 32. Rules engine 30 then reevaluates all conditions in compiled rules 26 that refer to a highPriority (dept1, dept2) fact.

Rules engine 30 determines whether to deploy a device-specific configuration policy by determining whether the facts in working memory 32 satisfy a condition of a NDL rule. For instance, rules engine 30 may detect a change in a current state of working memory 32. Rules engine 30 then determines whether the condition of a NDL rule is satisfied in light of the current state of working memory 32. For example, rules engine 30 may determine that the condition of a NDL rule is satisfied. In this case, rules engine 30 may assert a require-Config fact associated with the NDL rule. If rules engine 30 asserts a requireConfig fact, rules engine 30 directs deployment engine 38 to deploy a respective one or more of configuration policies 36.

In other words, deployment engine 38 deploys a device-specific configuration policy subject to rules engine 30 evaluation of forwarding chaining business-level rules and network level rules. For example, deployment engine 38 may package the information in configuration policies 36 into policy messages 13 and output policy messages 13 that inform network devices 8 that the device-specific configuration policy is deployed. In one embodiment, deployment engine 38 sends policy messages 13 to network devices 8 whenever rules engine 30 adds or removes a device-specific configuration policy of configuration policies 36 from the current set of deployed policies. In an alternate embodiment, network devices 8 send queries to deployment engine 38 whenever network devices 8 receive configuration change requests directly from administrator 10 or other user. In this alternate embodiment, deployment engine 38 accesses the set of currently deployed device-specific configuration policies 36 and directs the querying network device 8 to apply or deny the configuration change request.

NMS 6 may receive events 15 from network 4 through event interface 34. Event interface 34 decapsulates events 15 to extract information relevant to determining whether to deploy a device-specific configuration policy. Event interface 34 then updates one or more facts in working memory 32 to reflect the information contained in the event. As discussed above, rules engine 30 detects these new facts and responds according to business rules 26 and network design rules 28. For instance, suppose network device 8A is an atomic clock. Network device 8A may then send an event stating that the date is now Sep. 30, 2005. Event interface 34 transforms this event into a fact such as date("2005", "sept", "30") and inserts the fact into working memory 32. At the same time, event interface 34 de-asserts the fact date("2005", "sept", "29"). Rules engine 30 may then detect that working memory 32 has changed. Rules engine 30 may then reevaluate business rules 26 and network design rules 28 in light of the change in working memory 32.

Figure 3:
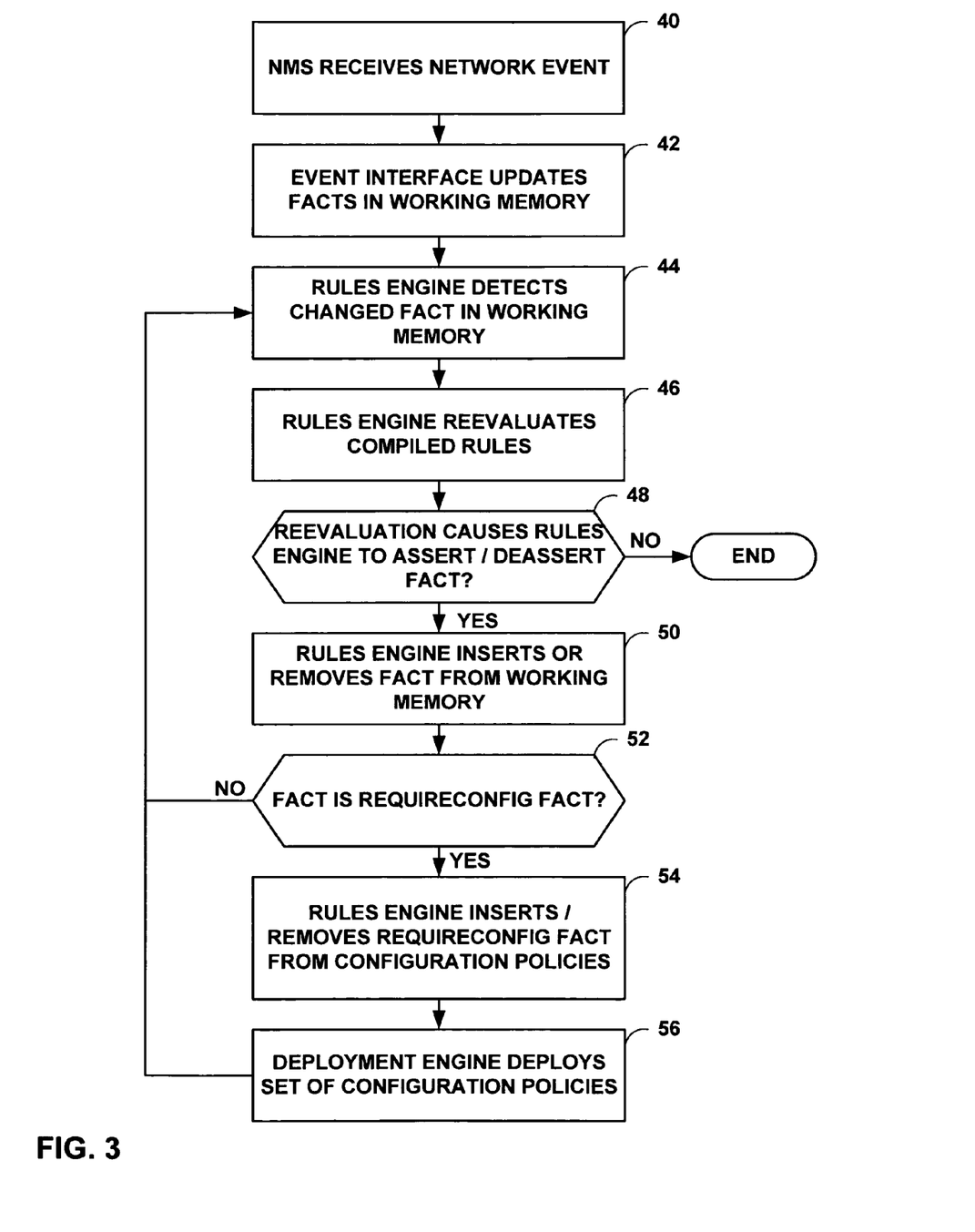
FIG. 3 is a flowchart illustrating an exemplary operation of a network management system of FIG. 1 in accordance with an embodiment of this invention.

FIG. 3 is a flowchart illustrating an exemplary operation of network management system 6 (FIG. 2) in accordance with an embodiment of this invention. Initially, event interface 34 of NMS 6 receives an event 15 from network 4 (40). Upon receiving event 15, event interface 34 updates working memory 32 to reflect event 15 (42).

After event interface 34 updates working memory 32, rules engine 30 may detect a change in a current state of working memory 32 (44). When rules engine 30 detects the change, rules engine 30 reevaluates the conditions of the business rules and NDL rules compiled into working memory 32 (46). If reevaluation of compiled rules in working memory 32 does not cause rules engine 30 to assert or de-assert a fact (NO of 48), rules engine 30 ceases reevaluating the compiled rules in working memory 32. On the other hand, if reevaluation of the compiled rules in working memory 32 causes rules engine 30 to assert or de-assert one or more facts (YES of 48), rules engine 30 inserts or removes the asserted or de-asserted fact from working memory 32 (50).

Next, rules engine 30 determines whether the asserted or de-asserted fact is a requireConfig fact (52). If the fact is not a requireConfig fact (NO of 52), rules engine 30 loops back to step 44 because rules engine 30 detects the change in working memory 32 caused by step 48. However, if the fact is a requireConfig fact, (YES of 52), rules engine 30 inserts or removes the requireConfig fact from configuration policies 36 (54). In addition, when rules engine 30 inserts or removes a requireConfig fact from configuration policies 36, deployment engine 38 may then deploy configuration policies 36 to network devices 8 by sending policy messages 13 through network 4 (56). Rules engine 30 then loops back to step 44 because rules engine 30 detects the change in working memory 32 caused by step 48.

Figure 4:
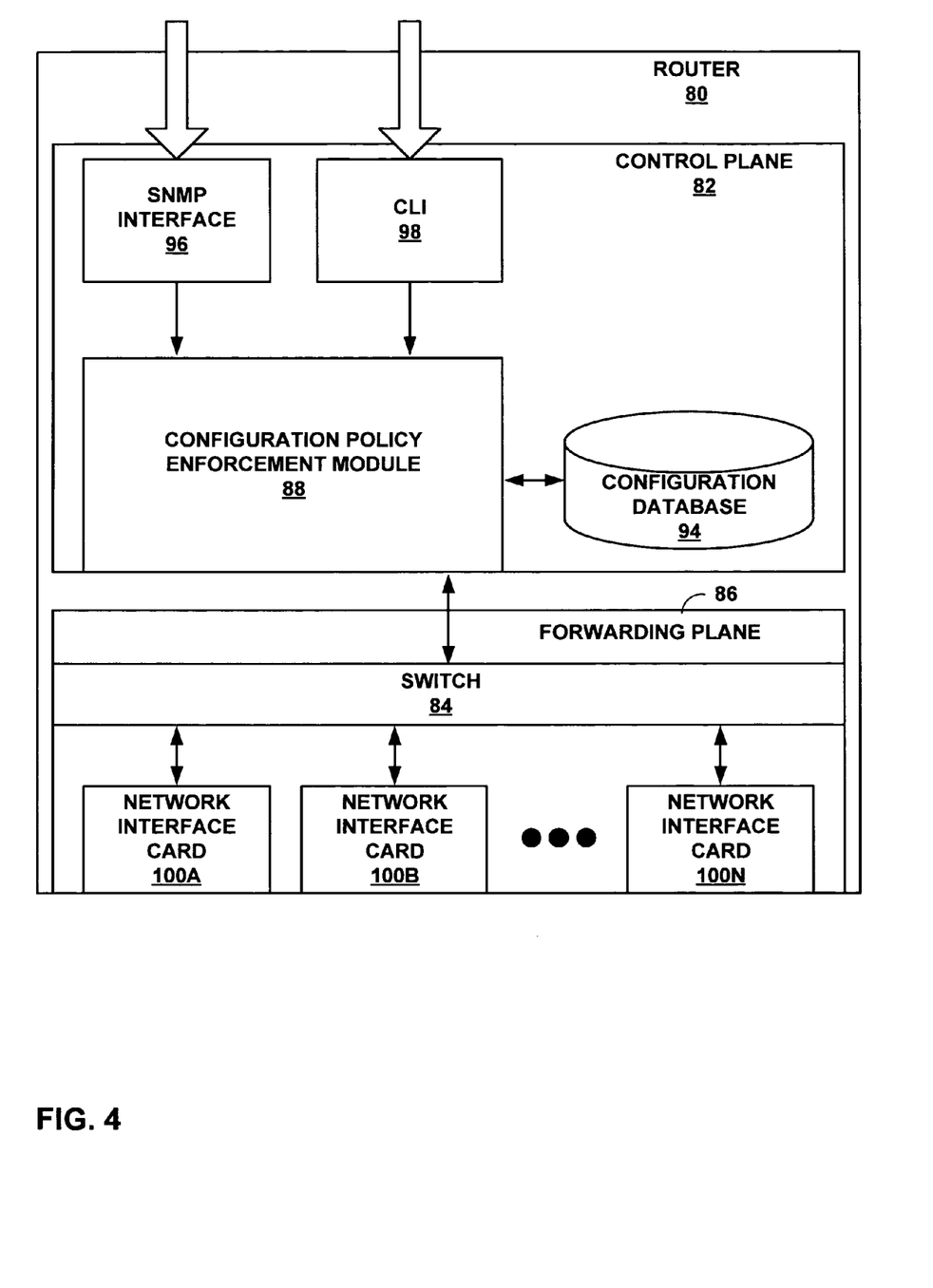
FIG. 4 is a block diagram illustrating an exemplary embodiment of a network device that is used in the configuration policy enforcement system of FIG. 1.

FIG. 4 is a block diagram illustrating an exemplary embodiment of a routing device 80 that is capable of acting as a network device 8 (FIG. 1) of a configuration policy enforcement system. Routing device 80 comprises a control plane 82, a high-speed switch 84, and a forwarding plane 86.

Forwarding plane 86 includes network interface cards 100A through 100N (collectively, network interface cards 100). When a network interface card in forwarding plane 86 receives a packet from network 4, the network interface card may use a forwarding table included in the network interface card to determine how to forward the packet. For instance, a forwarding table may instruct a network interface card to forward the packet to another network interface card in forwarding plane 86 via switch 84. However, if the packet is addressed to routing device 80, network interface cards 100 may forward the packet to control plane 82 via switch 84.

Control plane 82 may process packets addressed to routing device 80 to build the forwarding tables contained in network interface cards 100. For example, control plane 82 may receive a packet that indicates that a specific link in network 4 has failed. Control plane 82 may then send messages to forwarding plane 86 that instruct network interface cards 100 to forward packets in such a way to avoid the failed link.

Control plane 82 may also send messages to forwarding plane 86 that instruct network interface cards 100 to comply with one or more configuration requirements. Control plane 82 stores these configuration requirements in a configuration database 94. Because network interface cards 100 obey messages from control plane 82 derived from configuration database 94, configuration database 94 governs the behavior of routing device 80. For instance, configuration database 94 may contain a rule that packets from a source A have higher priority than packets from source B. Based on this rule in configuration database 94, control plane 82 may instruct network interface cards 100 to include a rule in their forwarding tables that causes packets from source A to have higher priority than packets from source B. The configuration requirements in configuration database 94 may thus shape the behavior of network 4 in important ways.

Control plane 82 may include several additional components. In the exemplary embodiment shown in FIG. 4, control plane 82 includes a configuration policy enforcement module (CPEM) 88, a SNMP interface 96, and a command line interface 98. In addition, control plane 82 may include interfaces that implement other communication protocols such as telnet, hypertext transfer protocol, and so on. A configuration database 94 in control plane 82 contains a configuration profile.

SNMP interface 96 and CLI 98 represent two possible interfaces through which router 80 may receive a configuration change request. Before router 80 applies a configuration change request, CPEM 88 verifies that the configuration change request complies with the deployed device-specific configuration policies. In particular, CPEM 88 may retrieve a list of configuration policies through policy messages 13 from NMS 6. Verification module 92 then scans through the list of deployed device-specific configuration policies and determines whether the configuration change request would be contrary to any of the deployed device-specific configuration policies.

If the configuration change request is not contrary to the deployed device-specific configuration policies, verification module 92 applies the configuration change request to configuration database 94. Once verification module 92 applies the configuration change request to configuration database 94, control plane 82 may send instructions to forwarding plane 86 to update forwarding tables in network interface cards 100 to reflect the new content of configuration database 94. In this way, the configuration change request changes how router 80 routes network traffic.

On the other hand, CPEM 88 may perform an alternate action when the configuration change request does not conform to a deployed device-specific configuration policy. For instance, CPEM 88 may reject the configuration change request when the configuration change request does not conform to the deployed device-specific configuration policy. Alternatively, CPEM 88 may apply the configuration change request and generate an event when the configuration change request does not conform to a deployed device-specific configuration policy. In other words, CPEM 88 may apply the configuration change request to configuration database 94 and generate an event. The event may be an alert sent to a senior network administrator warning of possible misconfiguration of routing device 80. Alternatively, CPEM 88 may send the event to NMS 6 as a network event 15.

An administrator may bypass the configuration change request verification function of CPEM 88 by supplying an identity credential to CPEM 88. In particular, CPEM 88 may receive an identity credential from a user who submits a configuration change request and apply the configuration change request to routing device 80 when the identity credential matches a stored identity credential. The identity credential may be a password. An organization using a configuration policy enforcement system may restrict the right to override configuration policies deployed to CPEM 88 to senior administrators who are likely to appreciate the business policies of the organization.

Figure 5:
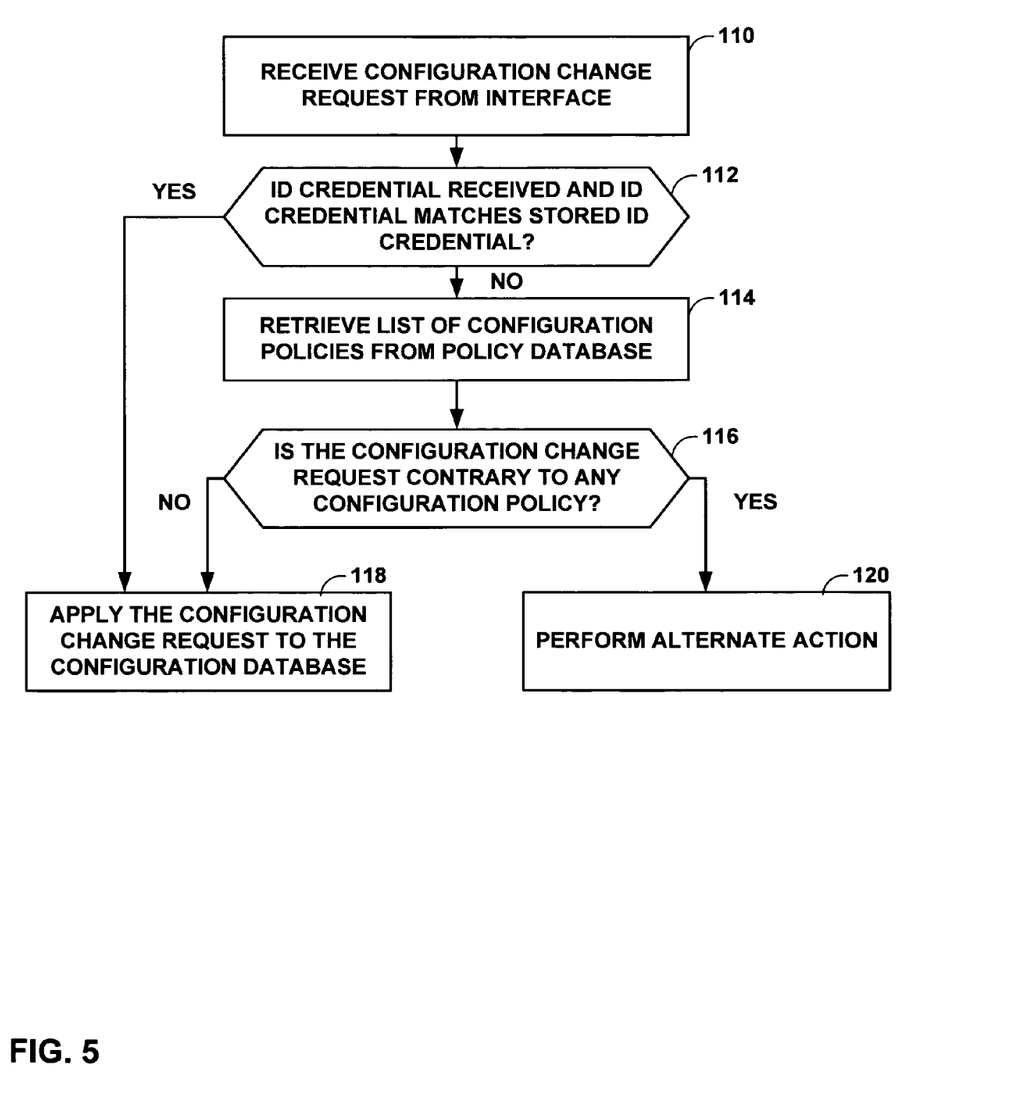
FIG. 5 is a flowchart illustrating an exemplary operation of a configuration policy enforcement module consistent with an embodiment of this invention.

FIG. 5 is a flowchart illustrating an exemplary operation of CPEM 88 (FIG. 5) consistent with an embodiment of this invention. Initially, CPEM 88 receives a configuration change request from an interface, e.g., SNMP interface 96 or CLI 98 (110). CPEM 88 then checks whether CPEM 88 received an identity credential with the configuration change request and whether the identity credential matches a stored identity credential (112). If CPEM 88 received an identity credential and the identity credential matches a stored identity credential (YES of 112), CPEM 88 applies the configuration change request to configuration database 94 (118). On the other hand, if CPEM 88 does not receive an identity credential with the configuration change request or the identity credential does not match a stored identity credential (NO of 112), CPEM 88 verifies the configuration change request.

To verify the configuration change request, verification module 92 of CPEM 88 retrieves a list of deployed device-specific configuration policies from NMS 6 (114). Verification module 92 then determines whether the configuration change request is contrary to any deployed device-specific configuration policy (116). If the configuration change request is not contrary to any deployed device-specific configuration policy (NO of 116), CPEM 88 applies the configuration change request to configuration database 94 (118). Otherwise, if the configuration change request is contrary to a configuration policy, (YES of 116), then CPEM 88 performs an alternate action (120). As explained above, the alternate action may comprise rejecting the configuration change request altogether, applying the configuration change request, but generating an event, or performing other actions.

Various embodiments of the invention have been described. For example, FIG. 5 described the configuration enforcement system in terms of a routing device. In addition, this disclosure illustrated the device-specific configuration policies in terms of a certain business rule definition language. Nevertheless, various modifications may be made without departing from the spirit and scope of the invention. For instance, a configuration policy enforcement system may be included in any network device with configurable behavior such as switches, personal computers, network telephones, printers, servers, mainframes, modems, access points, personal digital assistants, cellular telephones, and so on. In addition, the business rule definition language and network design language may appear substantially different than this disclosure shows. The business rule definition language or network design language may be an imperative, functional, logical, natural, or any other class of computer-readable language. These and other embodiments are within the scope of the following claims.

We claim:

1. A computer-implemented method comprising:
    invoking a rules engine of a network management system to evaluate a business rule to determine whether to enforce a device-independent business policy regarding a computer network having a plurality of network devices;
    when the device-independent business policy is to be enforced, invoking the rules engine of a network system to evaluate a network design rule that relates the business policy to a device-specific configuration policy; and
    deploying the device-specific configuration policy to a set of one or more of the network devices of the computer network, wherein the device-specific configuration policy controls application of configuration change requests to configuration profiles of the network devices after the configuration change requests are received via interfaces of the respective network devices.

2. The method of claim 1, further comprising receiving an event from the computer network that contains information relevant to determining whether to deploy the device-specific configuration policy.

3. The method of claim 2, wherein the event contains information relevant to determining whether the business policy is currently in force.

4. The method of claim 2, further comprising:
    updating a fact in a working memory according to the information contained in the event;
    evaluating the business rule by determining whether the facts in the working memory satisfy a condition of the business rule; and
    evaluating the network design rule by determining whether the facts in the working memory satisfy a condition of the network design rule.

5. The method of claim 1, further comprising asserting a fact within a working memory of the rules engine when the business policy is currently in force, wherein the fact operates as an input condition to the network design rule.

6. The method of claim 5,
    wherein evaluating the business rule comprises:
        detecting a change in a current state of a working memory; and
        determining whether a set of conditions of the business rule is satisfied by the current state of the working memory.

7. The method of claim 6, wherein determining whether the set of conditions is satisfied comprises reevaluating each of the conditions using a forward-chaining rules engine in response to the asserted fact.

8. The method of claim 6, wherein deploying the device-specific configuration policy comprises deploying the device-specific configuration policy when the fact causes the set of conditions of the network design rule to be satisfied.

9. The method of claim 8, further comprising deploying a second device-specific configuration policy to a different one or more of the network devices when the device-independent business policy is to be enforced.

10. The method of claim 1, wherein deploying the device-specific configuration policy comprises sending policy messages from the network management system to the one or more network devices to configure the network devices in accordance with the device-specific configuration policy.

11. The method of claim 1, further comprising compiling the business rule and the network design rule into a forward-chaining working memory maintained by the network management system.

12. The method of claim 1, wherein at least one of the network devices is a routing device.

13. The method of claim 1, further comprising receiving the business rule and the network design rule through a user interface.

14. The method of claim 1, wherein the business rule is written in a business rule definition language in a form that is independent of that particular types of network devices or a topology of the network.

15. The method of claim 14, wherein the network design rule is written in a network design rule language that relates the network-independent business rule to particular types of network devices or a particular typology of the network.

16. A network management system comprising:
a set of business rules that describe device-independent business policies, wherein the business rules are written in a format that conforms to a business rule definition language and are independent of the types of network devices within a computer network;
a set of network design rules that relate the device-independent business policies to device-specific configuration policies, wherein the network design rules conform to a network design language used to describe the network devices and topology of the network; and
a rules engine that evaluates the business rules and the network design rules to select one or more of the device-specific configuration policies for deployment; and
a deployment engine that deploys the device-specific configuration policies selected by the rules engine to one or more of the network devices, wherein each of the selected device-specific configuration policies control application of configuration change requests to configuration profiles of the network devices after the configuration change requests are received via interfaces of the network devices.

17. The network management system of claim 16, further comprising an event interface to receive an event from the computer network that contains information relevant to determining whether to deploy the device-specific configuration policies.

18. The network management system of claim 17, wherein the event contains information relevant to determining which of the business policy are currently in force.

19. The network management system of claim 17,
further comprising a working memory,
wherein the event interface updates a fact in the working memory based on the information contained in the event, and
wherein the rules engine determines which of the business policies are currently in force by determining whether the facts in the working memory satisfy a set of conditions associated with each of the business rules, and
wherein the rules engine determines which of the device-specific configuration policies is deployed by determining whether the facts in the working memory satisfy a set of conditions associated with each of the network design rules.

20. The network management system of claim 17, wherein the rules engine asserts one or more facts within the working memory when the business policy is currently in force to direct the deployment engine to deploy the selected configuration policies.

21. The network management system of claim 16, wherein the deployment engine deploys the device-specific configuration policy by sending policy messages that contain the device-specific configuration policies to the network devices.

22. The network management system of claim 16, further comprising a rules compiler to compile the business rules and the network design rules into a form that the rules engine is able to use.

23. The network management system of claim 16, wherein the rules engine applies a forward-chaining algorithm to evaluate the business rules and the network design rules.

24. A system comprising:
a network management system comprising:
(i): a set of business rules to contain a business rule that describes a business policy regarding a computer network,
(ii): a set of network design rules to contain a network design rule that describes a relationship between the business policy and a device-specific configuration policy,
(iii): a rules engine to determines whether a business policy is currently in force by evaluating the business rule and determines whether to deploy a device-specific configuration policy by evaluating the network design rule, and
(iv): a deployment engine to deploy the device-specific configuration policy; and
a network device comprising:
(i): a configuration database to store a configuration profile for the network device;
(ii): an interface to receive configuration change requests that request modifications to the configuration profile; and
(iii): a configuration policy enforcement module that manages the configuration profile and applies the device-specific configuration policy to control application of the received configuration change requests to the configuration profile of the network devices to ensure the configuration profile to conforms to the device-specific configuration policy when the device-specific configuration policy is deployed by the network management system.

25. The system of claim 24,
wherein the network device sends an event to the network management system that contains information relevant to determining whether to deploy the device-specific configuration policy, and
wherein the deployment engine of the network management outputs policy messages to the network device that identify the device-specific configuration policy to be deployed.

26. A non-transitory computer-readable medium comprising instructions that cause a processor to:
determine whether a business policy regarding a computer network is currently in force by evaluating a business rule that describes the business policy;

determine whether to deploy a device-specific configuration policy by evaluating a network design rule that describes a relation between the business policy and a device-specific configuration policy, and deploy the device-specific configuration policy to direct a network device to apply the device-specific configuration policy to configuration change requests subsequently received by the network device via an interface of the network device to confirm that that subsequently received configuration change request conform to the business policy.

27. A method comprising:

storing, with a network device, data defining a configuration profile that specifies current values of configuration options for the network device;

receiving, with the network device, a device-specific configuration policy from a network management system;

receiving, with an interface of the network device, configuration change requests that request modifications to the configuration profile; and applying the device-specific configuration policy to control application of the received configuration change requests to the configuration profile of the network devices to ensure the configuration profile conforms to the device-specific configuration policy.

28. A network device managed by a network management system, the network device comprising:

a configuration database to store a device-specific configuration profile for the network device, wherein the configuration profile specifies current values of configuration options for the network device;

an interface that receives configuration change requests that request modifications to the configuration profile; and a control unit comprising a configuration policy enforcement module that applies the device-specific configuration policy to control application of the received configuration change requests to the configuration profile of the network devices so as to ensure the configuration profile conforms to the device-specific configuration policy.

* * * * *